United States Patent [19]

Hayama

[11] Patent Number: 4,782,561
[45] Date of Patent: Nov. 8, 1988

[54] CONE LOCK
[75] Inventor: Eisaku Hayama, Fukuyama, Japan
[73] Assignee: Koei Kinzoku Kogyo Kabushiki Kaisha, Hiroshima, Japan
[21] Appl. No.: 65,531
[22] Filed: Jun. 23, 1987
[30] Foreign Application Priority Data
Apr. 15, 1987 [JP] Japan .................. 62-55947[U]
[51] Int. Cl.⁴ ............................................ B65D 21/02
[52] U.S. Cl. .................................. 24/287; 24/288
[58] Field of Search .............................. 24/287, 288
[56] References Cited
U.S. PATENT DOCUMENTS 3,456,967 7/1969 Tantlinger et al. ................ 24/287
3,894,493 7/1975 Strecker ............................ 24/287
4,212,251 7/1980 Dimartino ......................... 24/287
4,352,613 10/1982 Bertolini .......................... 24/287
4,564,984 1/1986 Takaguchi ........................ 24/287

Primary Examiner—Victor N. Sakran
Attorney, Agent, or Firm—Jordan and Hamburg

[57] ABSTRACT

A cone lock wherein a lever for rotating a cone in engagement within a socket of a container is provided with a stopper for defining the pivotal movement of the lever to prevent the cone lock from falling out. The lever is rotatable and slidable longitudinally for operating a pair of upper and lower cones which are set to be directed opposed to one another so that when one cone is removed, the other is not disengaged.

16 Claims, 11 Drawing Sheets

CONE LOCK

BACKGROUND OF THE INVENTION

The present invention relates to an improvement in a cone lock which is related to the art of loading and fixedly fastening containers.

For example, in the case where a number of containers are loaded on a ship, when they are merely stacked on the ship, there possibly occurs a dislocation of loads due to rolling of the ship or the like on sail. Therefore, various metal fittings for the purpose of connection and fixedly fastening are interposed between the floor surface and containers in a first layer, and between containers stacked one upon another. The present inventor has previously proposed a cone lock used as one kind of the metal fittings, as shown in the drawings of Japanese Utility Model Application Laid-Open No. 2580/1987 (Japanese Utility Model Application No. 93025/1985) publication. This proposed cone lock generally has an arrangement as will be described below.

Figure 26:
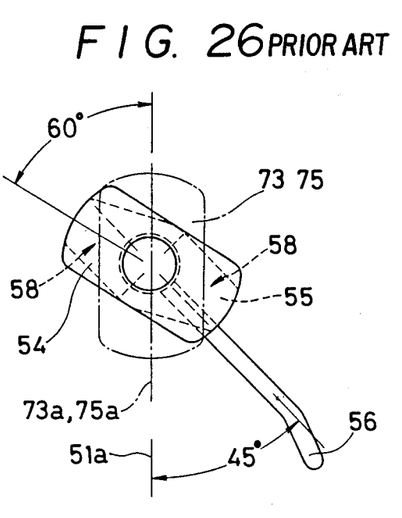
FIGS. 26 and 27 are explanatory views showing the rotating position of the lever and upper and lower cones of the cone lock.

That is, as shown in FIGS. 23 to 27, a shaft 53 is longitudinally extended into a casing 51 provided with a horizontally spread support board 52, and a pair of cones 54 and 55 are fixedly mounted on upper and lower ends of the shaft 53, said shaft 53 and both cones 54 and 55 being rotated by the pivotal movement of an operating lever 56 of which base end is secured to the shaft 53. These cones 54 and 55 are inserted into engaging holes 73 and 75 of cone sockets (see FIGS. 19 to 21 later described) mounted at corners of the container, and have a planar rectangular shape so that the cones may be engaged with the cone sockets by the rotation caused by the operation of the lever 56 after being inserted. The lever 56 is normally maintained at 45 degrees counterclockwise relative to a center line 51a of the casing 51 (When the cone lock is mounted for use, the center line 51a is placed in registration with center lines 73a and 75a extending lengthwise of the engaging holes 73 and 75 to serve as a reference for determining the relative position between the cones 54 and 55 and the engaging holes 73 and 75.) by means of a spring 57 held between the support board 52 and the shaft 53 being biased. At that time, both the upper and lower cones 54 and 55 are placed in their normal locked position with respect to the respective engaging holes 73 and 75 as shown in FIG. 26, which state is a basic attitude, and under this state, the lever 56 is operated to rotate the cones 54 and 55. The lower cone 55 is formed with torsional bevels 58 and 58 which come into contact with the edge of the engaging hole 73 to automatically rotate the cone 55 so as to be inserted into the engaging hole 73. So the lower cone 55 is automatically rotated while being guided by the bevels 58 and 58 other than the operation of the lever 56. The prior application disclosed in the aforementioned publication is intended to enhance to the working efficiency and safety of the work of fixedly fastening containers by automatically rotating the cone 55 with the provision of the bevels 58 and 58. However, as a result of a further research, there is found a further improvement as will be discussed below.

Figure 19:
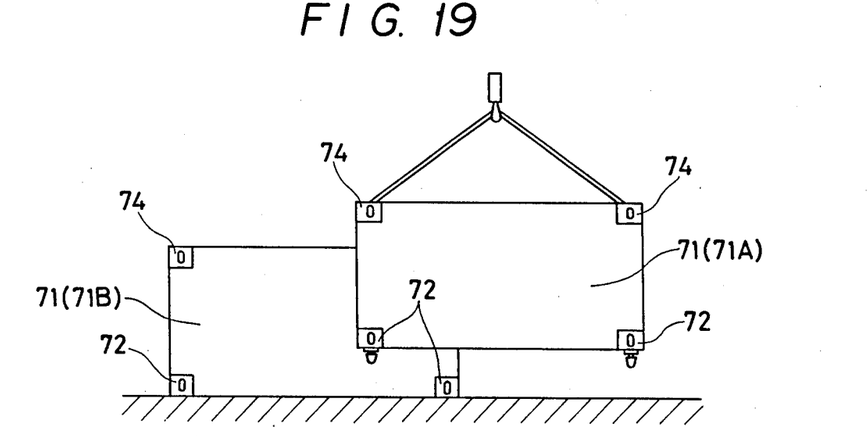
FIG. 19 is an explanatory view of a container loading work.
Figure 20:
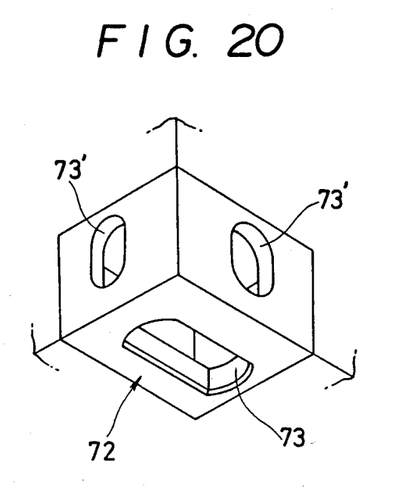
FIG. 20 is a perspective view of a cone socket at a lower corner.
Figure 21:
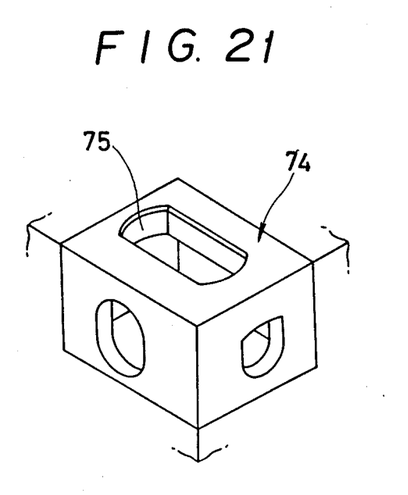
FIG. 21 is a perspective view of a cone socket at an upper corner.

In an actual situation of fixedly fastening containers utilizing the aforesaid cone lock, the upper cone 54 is first engaged with the lower engaging hole 73 of the cone socket 72 at the lower corner of the container in the upper layer 71A pulled up by a crane (For the container 71A, see FIGS. 19 to 21 later described. Where the floor surface and the container 71B in the first layer are connected, the container 71B in the first layer is indicated, in which case, avoidance of work at a high level is not demanded, the cone lock is turned upside down and first can be mounted on the floor surface.); the cone lock being suspended on the container 71A is transferred to the container 71B in the lower layer and lowered on the cone socket 75 at the upper corner. As previously mentioned, the lower cone 55 is provided with the guide bevels 58 and 58 and therefore, the cone 55 is automatically rotated, and inserted into and engaged with the engaging hole 75. At the time when the upper cone 54 is first mounted on the upper layer side, the end of the operating lever 56 is made possible for operation after mounting, and therefore it assumes an attitude to be projected laterally and outwardly from the side of the cone socket 72 or from the side of the container 71A body face to the first-mentioned side. Therefore, when the end of the lever 56 is erroneously brought into contact with the lower layer container 71B during the transfer of the upper layer container 71A with the cone lock first attached thereto onto the lower layer container 71B by the crane, the lever 56 freely swings depending upon the direction thereof, as a result of which the upper cone 54 is possibly disengaged from the engaging hole 73 to allow the cone lock to fall. This lowers the working efficiency, gives rise to a breakage of the cone lock due to the shock caused by such falling or leads to a possible unexpected personal accident. In this case, the spring 57 adapted to urge the operating lever 56 so as to maintain the latter in a normal state acts, to be sure, in a direction of impeding the free pivotal movement thereof, but the spring 57 merely has a force so weak that is enough to swing the lever 56 by hand, and therefore cannot restrain the pivotal movement of the lever 56.

Figure 27:
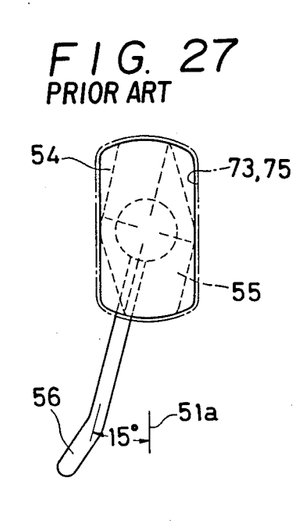

Furthermore, in the unloading work, the aforesaid cone lock is suspended on the upper layer container 71A which is released from engagement with the lower layer container 71B and pulled up by the crane. The lever 56 is operated prior to the pull-up in order to disengage the lower cone 55 from the engaging hole 75 of the socket 74 in the lower layer container 71B. In this operation, the lever 56 is pivotally moved approximately 75 degrees clockwise from the normal attitude thereof but sometimes, both the upper and lower cones 54 and 55 have their open-rotating direction from the normal state set to the same direction and both the cones 54 and 55 are superposed in plane to simultaneously assue the open position with respect to the upper and lower engaging holes 73 and 75 (see FIG. 27). Therefore, if the pull-up by the crane is started before the operation of the pivotal movement of the lever 56 is completely finished, both the upper and lower cones 54 and 55 become simultaneously disengaged despite only the lower cone 55 is originally disengaged, and consequently, the cone lock is sometimes left on the lower layer container 71B without being suspended on the upper layer container 71A.

SUMMARY OF THE INVENTION

In view of the above-described points, it is an object of the present invention to overcome the aforesaid inconveiences by improvement of the aforesaid prior art.

In order to achieve this object, this invention provides a cone lock, comprising a longitudinally extending shaft extended through a casing provided with a support board, a pair of cones fixedly mounted on both upper and lower ends, respectively, of said shaft so that when one cone is in an open position with respect to an engaging hole of a cone socket, the other cone is in a locked position without fail, an operating lever having an opening opened at the side of said casing and a base end mounted on said shaft, said operating lever having its end extended externally of the casing, said shaft and said both cones fixedly mounted on said shaft being reciprocatingly rotated within the range of a predetermined angle by the pivotal movement of said operating lever, a basic attitude to simultaneously place both the cones in a normal locked position being set to an approximately intermediate position in said range of the angle, the pivotal direction of the operating lever to shift each cone to the open position being set in the opposite direction from said basic attitude, the pivotal movement of the operating lever for shifting one cone from the basic attitude to the open position being impeded by a releaseable engagement with a stopper step projected from the side of the casing, said engagement being released to enable the pivotal movement of the operating lever in the same direction, said the other cone being provided with a torsional bevel which comes into contact with the edge of the engaging hole to automatically rotate said cone so as to be inserted into said engaging hole, a spring means for returning and rotating said cone to said basic attitude against said automatic rotation, and a stopper for impeding the return and pivotal movement of the operating lever by said spring means to an angular position over the pivotal angle of the operating lever at said automatic rotation.

In the cone lock of the present invention, the operating lever is set in its basic attitude in which the upper and lower cones displaced angularly from each other to an approximately intermediate position in the allowable range of pivotal movement thereof are simultaneously placed in the normal locked position, and when the lever is pivotally moved in one direction from said attitude, either cone rotates in a direction (an open rotating direction) wherein the cone is deviated from the engaging hole), whereas the other cone conversely rotates in a direction wherein the cone deepens the engaging angle with respect to the engaging hole. To cope with the pivotal movement of the lever in the direction wherein one cone first attached to the upper layer container is rotated in the open rotating direction, the stopper means by engagement between the lever and the stopper step provided on the casing, whereby the pivotal movement of the lever in the same direction is impeded unless the stopper is intensionally released.

As described above, in the cone lock of the present invention, the stopper means is provided against the pivotal movement of the operating lever for rotating the cone first attached to the container from the normal locked position to the open position, whereby restraining the free pivotal movement of the lever to prevent the cone lock from being fallen.

The upper and lower cones are arranged in the form of a plane X-letter so that when one cone is in an open position, the other is placed in a locked position without fail, and the cones are set in their rotating direction to be opposite to each other. Therefore, it is possible to overcome an inconvenience that when suitable one of cones is turned to the open position and disengaged from the cone socket, the other cone is not erroneously disengaged.

While the outline of the present invention has been described briefly, this invention, its other objects and new features will be completely apparent from reading of the ensuing detailed description in conjunction with embodiments shown in the accompanying drawings. It is noted that the drawings merely comprise an embodiment for explanation of the present invention, and are not intended to limit the scope of the invention.

DESCRIPTION OF THE PREFERRED EMBODIMENTS

A cone lock according to the present invention will now be described with reference to the drawings.

Referring now to FIGS. 1 to 6, a casing indicated at 1 is integrally provided with a horizontally spread support board 2, and has a vertically extending-through axial hole 3. The support board 2 has a function as a spacer interposed between a floor surface and a first layer container or between stacked upper and lower containers. Projected portions 4 and 5 of the casing 1 projected upward and downward from the support board 2 are formed into a planar shape of a rectangle (of which the short side is rounded) which is registered with and smaller than an engaging hole of which a planar open shape comprises a rectangle (of which short side is rounded) so that said portions 4 and 5 may be fitted into the engaging hole of the cone socket, whereby the projections 4 and 5 play a role of preventing the whole cone lock from being rotated with respect to the cone socket during use. The casing 1 is wholly divided into two left and right sections and assembled by bolts 6, 6 A shaft 7 is rotatably inserted into the axial hole 3, and cones 8 and 9 are integrally secured to the upper and lower ends, respectively, projected from the axial hole 3, the cones 8 and 9 being formed into a planar rectangle (of which the short side is rounded) so that the cones 8 and 9 may be rotated after being inserted into the engaging hole of the cone socket. Among both the cones 8 and 9 which are rotated along with the shaft 7, the upper cone 8 is formed into an approximately flat plate and has a planar shape of a rectangle (see 8' in FIG. 2B) in which, when an operating level 13 later described is in a basic attitude of an angle of 10 degrees, is set to a clockwise (rightward) 28 degrees position with respect to a center line 1a of the casing 1 (the center line 1a is a center line extending lengthwise of the projections 4 and 5 of the casing, said center line being hereinafter called a central line which serves as a 0 degree reference of the rotating angle). That is, the cone 8 is to be disengaged from the engaging hole when the lever 13 in its basic attitude is pivotally moved through 27 degrees counterclockwise (leftward) as will be described later. Two corners 8'a and 8'b of the rectangular 8' which has no substantial relation with engagement and release with respect to the engaging hole are in the form of a precut shape, the cone 8 being generally formed into a planar hexagon. An error of one degree between said 28 and 27 degrees results from the formation of a clearance due to a difference in size of the planar shape of the engaging hole and cone. The lower cone 9 has a planar shape of a rectangle (see 9' in FIG. 4B) set to leftward 27 degrees as viewed from the top with respect to the central line 1a when the operating lever 13 is again in its basic attitude of an angle of 10 degrees. That is, the cone 9 is disengaged from the engaging hole when the lever 13 is pivotally moved through leftward 26 degrees (an error of one degree also results from a formation of a clearance between the engaging hole and the cone). Two corners 9'a and 9'b of the rectangle 9' which has no substantial relation with engagement and release with respect to the engaging hole are in the form of a precut shape and being generally formed into a planar hexagon. Also, the lower cone 9 is in the form of an approximately conical body whose lower end is sharpened and is formed with two torsional bevels 10 and 10 in a symmetrical position of 180 degrees in a part of the bevel. These torsional bevels 10 and 10 are provided so that when the cone 9 is brought into engagement with the engaging hole as will be described later, the cone 9 is urged against the engaging hole while being angularly displaced, whereas the bevels come into contact with and slide along the edges of the engaging hole to automatically rotate the cone 9 so as to eliminate said displacement, the bevels being formed into a torsinal curve such that a part of a screw is taken in a leftward portion as viewed from the top with respect to edges 11 and 11 formed on the bevel of the cone 9. The relative positional relation between the upper cone 8 and the lower cone 9 is that they are arranged crossed in the form of the letter X as viewed from the top as will be apparent from the above description and as clearly shown in FIGS. 11 to 14 so that when one of the cones 8 and 9 is in the open position, the other is placed in the locked position without fail.

Figure 1:
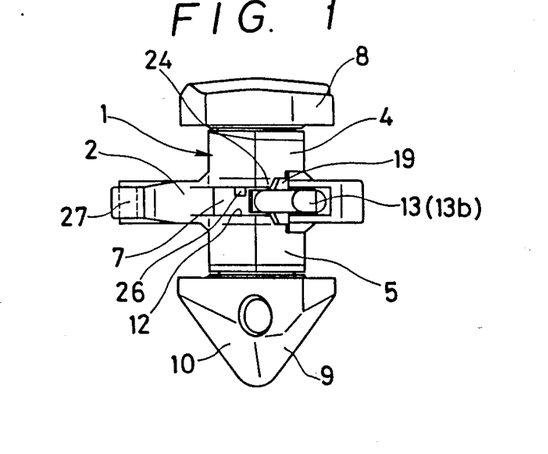
FIG. 1 is a front view of a cone lock according to one embodiment of the present invention.
Figure 2:
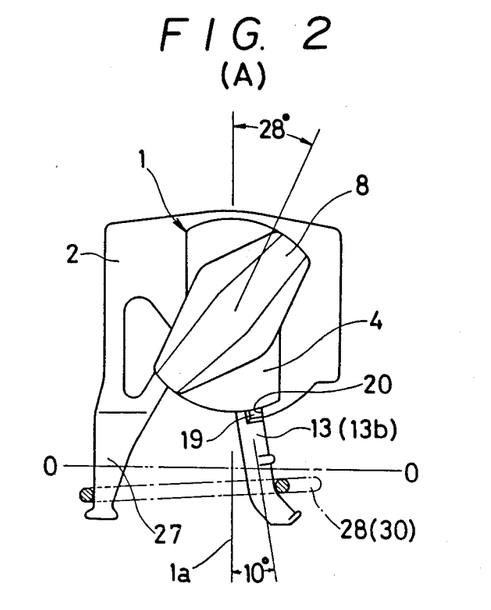
FIG. 2A is a plan view thereof.
FIG. 2B illustrates the shape of an upper cone.
Figure 3:
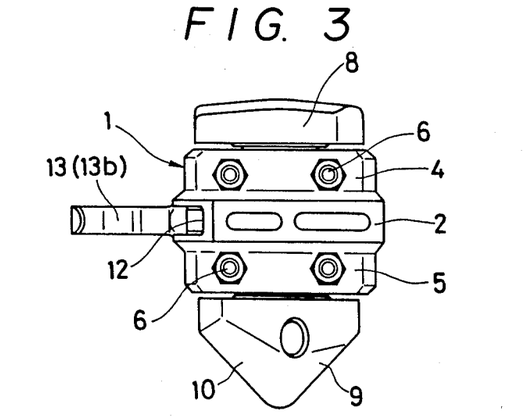
FIG. 3 is a side view of the cone lock.
Figure 4:
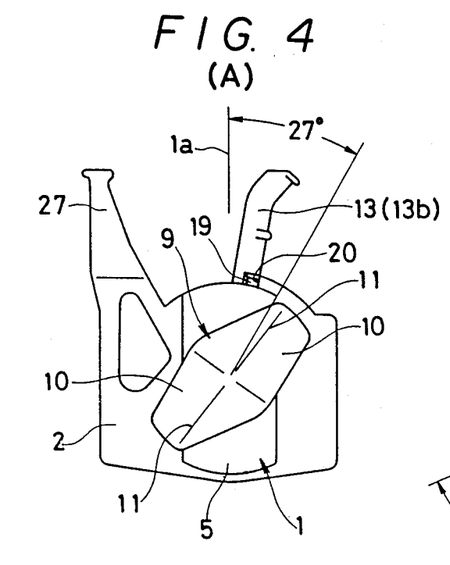
FIG. 4A is a bottom view thereof.
FIG. 4B illustrates the shape of a lower cone.
Figure 5:
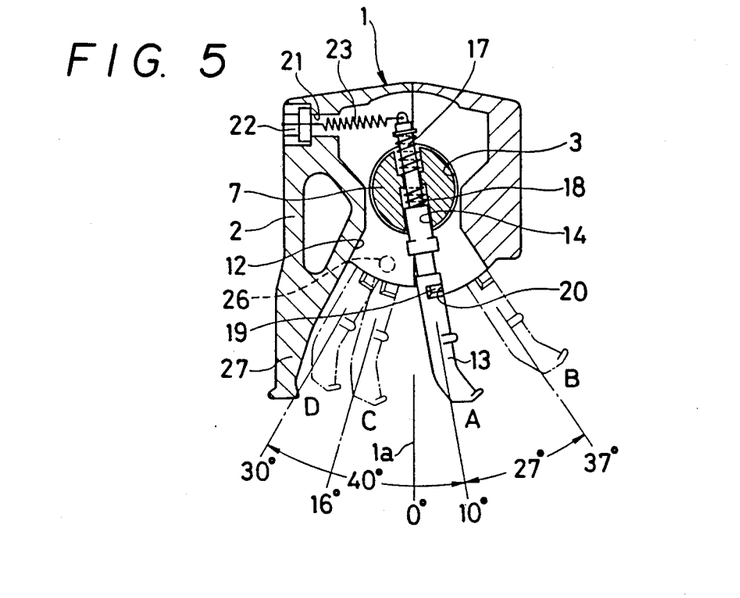
FIG. 5 is a cross sectional view of the cone lock.
Figure 6:
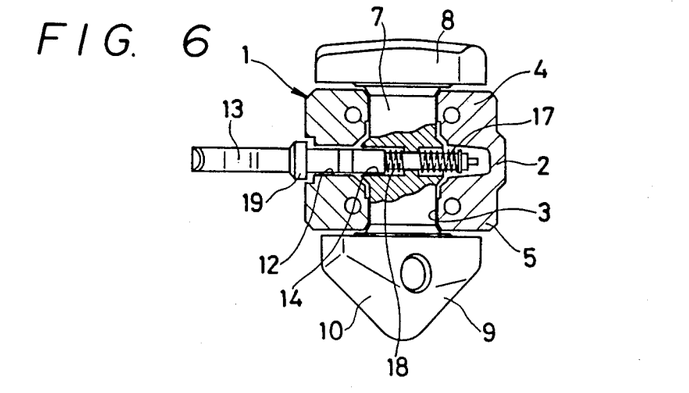
FIG. 6 is a longitudinal sectional view thereof.
Figure 7:
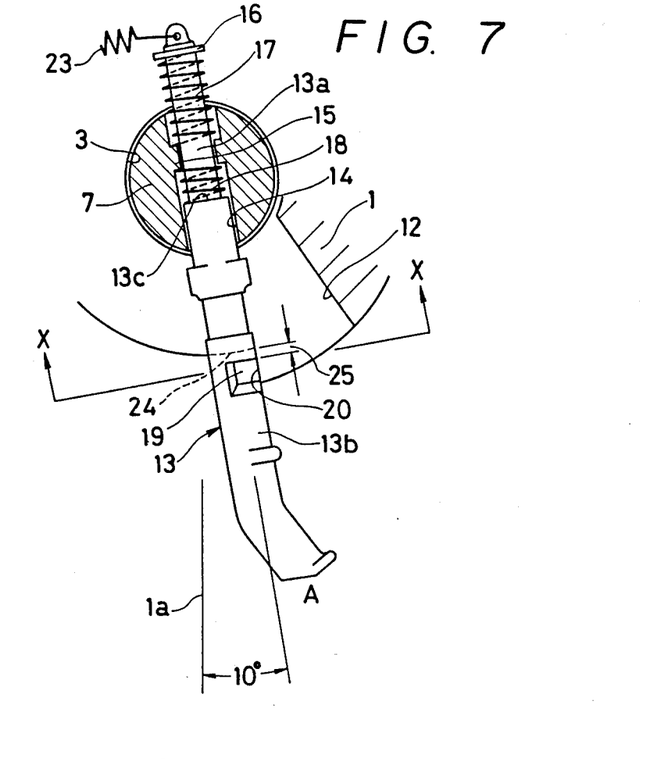
FIG. 7 is an enlarged plan view showing the state where a lever is in engagement with a stopper.
Figure 8:
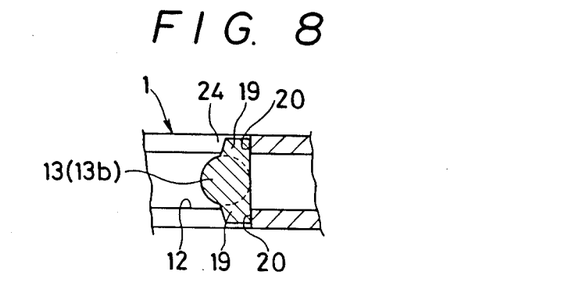
FIG. 8 is a sectional view taken on line X—X of FIG. 7.
Figure 9:
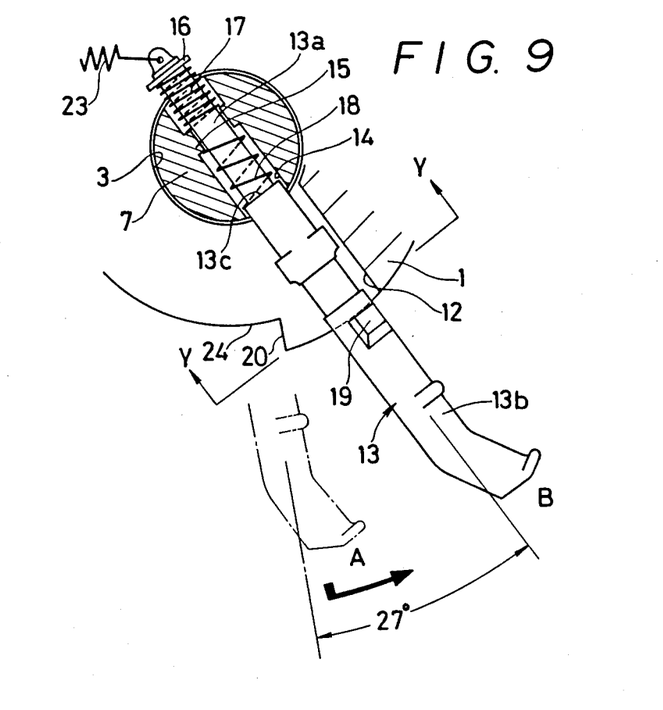
FIG. 9 is an enlarged plan view showing the stopper released state of the lever.
Figure 10:
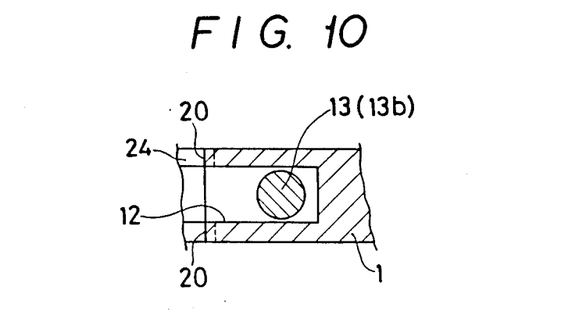
FIG. 10 is a sectional view taken on line Y—Y of FIG. 9.

The casing 1 including the support board 2 is provided with an opening 12 which is open to the side thereof, the opening having a side edge opened in a fan-shape in a horizontal direction, and an end of the lever 13 whose base end is fixed to the shaft 7 is projected from the opening. This lever 13 is pivotally movable in the range of 67 degrees in total, 37 degrees of leftward turn and 30 degrees of rightward turn, and is reciprocatingly rotated in said range between the shaft 7 and the upper and lower cones 8 and 9 secured to the shaft 7 with respect to the casing 1. As shown in FIGS. 7 to 10 in an enlarged scale, the lever 13 has a small diameter portion 13a on the base end side and a large diameter portion 13b on the fore-end side thereof, both portions being disposed in a concentric relation, and is slidably inserted lengthwise into an insert hole 14 formed in the shaft 7, the lever having a coil spring 17 as a first spring means interposed between an inward collar 15 formed in the inner wall of the insert hole 14 and a collar plate 16 attached to the end of the small diameter portion 13a and a further coil spring 18 interposed between a stepped portion 13c formed in the border between the small and large diameter portions 13a and 13b and the inward collar 15, whereby the whole lever 13 is normally placed in an attitude in which it is pulled in and toward the casing 1 by the balance of forces of the springs 17 and 18. The large diameter portion 13b of the lever is formed at a portion close to the base end with a stopper 19 toward the leftward turn. At the opening 12 on the side of the casing 1 is formed a stopper stepped portion or a shoulder 20 by which when the lever 13 is turned leftward, the lever comes into contact with the stopper 19 at an angle of 10 degrees from the central line 1a to stop the pivotal movement of the lever 13, and when the lever 13 is turned in the same direction beyond the shoulder 20, the whole lever 13 is pulled, prior to said pivotal movement, in a direction of pulling it out of the casing against the resiliency of the coil spring 17 to release the engagement between the stopper 19 and the stopper shoulder 20 (see FIGS. 7 and 8, and FIGS. 9 and 10). A through-hole 21 is made from the space within the opening 12 to the side wall of the support board 2 of the casing 1, and a coil spring 23 as a second spring means is extended between an end cover 22 mounted in the opening of the through-hole 21 and the force end of the small diameter portion 13a of the lever, whereby the lever 13 in its normal condition is in a position of 10 degrees at which the stopper 19 is placed in contact with the stopper shoulder 20 by tension of the coil spring 23, and the lever is pivotally moved leftward through 27 degrees with the assistance of tension of the coil spring 23 by the pulling operation of the lever 13 and rightward in the range of 40 degrees against the spring 23. In the normal attitude in which the stopper 19 is placed in contact with the shoulder 20, the lever 13 is laid in the retracted position but the stopper 19 itself is not in contact with the front wall (24, see FIG. 7) before the stopper shoulder 20 by virtue of the balance between two coil springs 17 and 18. There is a resilient play clearance 25 in a retracting direction as the whole lever 13 to provide a function to damp shocks or the like put in the same direction. While the second coil spring 18 interposed between the lever shoulder 13c and the inward collar 15 of the shaft 7 has its principal function to perform said damping action, only the first coil spring 17 as the first spring means will suffice. To cope with the rightward pivotal movement of the lever 13 in the normal attitude, an engaging projection 26 as a stopper to define said pivotal movement is provided within the opening 12. That is, the engaging projection 26 is freely moved in and out of the inner wall on the upper side of the opening 12 and is resiliently urged in the projecting direction (downward) by means of spring means not shown. As shown in FIG. 5, the aforesaid projection is not actuated when the lever 13 is pivotally moved rightward through 26 degrees from the normal attitude (10 degrees) and is engaged when the lever is pivotally moved through 40 degrees, which is the maximum. When the lever 13 is manually operated, it is made to be passed through by hand. Enough spring force is provided to impede the return movement of the lever 13 by the resiliency of the coil spring 23 as the second spring means. On the support board 2 of the casing 1 is projectingly formed an engaging lever 27 in engagement with an operating rod 28 later described used when the lever 13 is operated forwardly in a horizontal direction.

Next, the procedure for loading and fixedly fastening containers using the aforementioned cone lock will be described. As shown in FIGS. 19 to 21, at corners of a container 71 there are fixedly mounted, at upper and lower corners of the container, four hollow lower-corner cone sockets 72 and four hollow upper-corner cone sockets 74 provided with engaging holes 73 and 75 at three sides, respectively. One set of the cone locks is constituted by four, and mutually opposed four pairs of the lower-corner cone sockets 72 of the upper layer container 71A and the upper-corner cone sockets 74 of the lower layer container 71B are connected to fixedly fasten the containers 71A and 71B with each other. The lower engaging hole 73 of the lower-corner cone socket 72 and the upper engaging hole 75 of the upper-corner cone socket 74 with which the cones 8 and 9 of the cone lock directly contact have a rectangular shape (of which the short side is rounded) having the same shape and same size, the rectangles being orderly arranged in the same direction. The cone lock is mounted in such a manner that the previously mentioned central line 1a is registered with center lines 73a and 75a extending lengthwise of both the engaging holes 73 and 75. The operation and procedure therefor are illustrated in FIGS. 11 to 14. When the central line 1a of the cone lock is registered with the center lines 73a and 75a of the engaging holes 73 and 75 indicated by the phantom outlines, in the normal state (prior to or posterior to mounting, the same arrangement is used), the upper and lower cones 8 and 9 and the lever 13 are in the position shown in FIG. 11. The operation and procedure will be itemized for explanation as follows:

(1) Insert the upper cone 8 into the lower engaging hole 73 of the lower-corner cone socket 72 of the container 71A to be loaded on the ship from the quay. That is, pull the lever 13 toward you from the basic attitude (normal state) of an angle of 10 degrees and manually swing it leftward through 27 degrees to move the upper cone 8 to the open position and insert the cone 8 into the engaging hole 73 (FIGS. 11 and 12).

Figure 11:
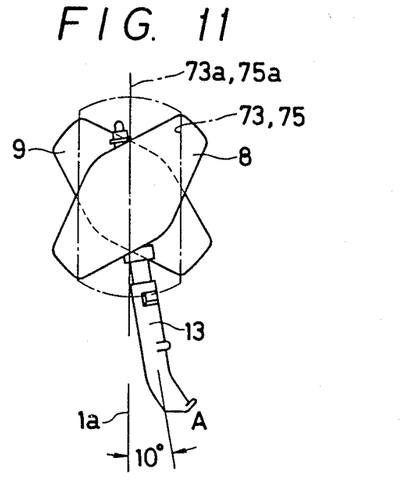
FIGS. 11 to 14 are explanatory views of the rotating position of the lever and the upper and lower cones.
Figure 12:
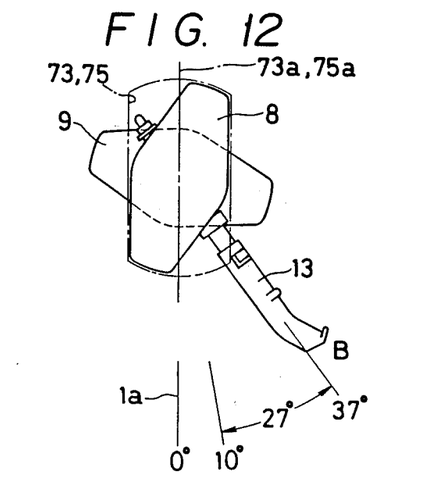

(2) Return the lever 13 to the basic attitude in the inserted state to put the upper cone 8 in the locked state (FIGS. 12 and 11). That is, when the lever 13 is returned to the basic attitude, the lever 13 is moved and returned to the base end by virtue of the coil spring 17, and the stopper 19 is placed in contact and engagement with the stopper shoulder 20 to impede the leftward rotation.

(3) Lower the container 71A to be an upper layer as it is on the lower container 71B already loaded on the ship.

Figure 13:
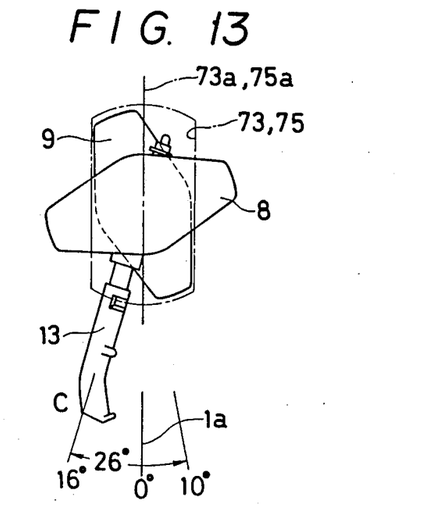

(4) When the lower cone 9 begins to impinge upon the edge of the upper engaging hole 75 of the upper-corner cone socket 74 of the lower container 71B, the cone 9 is guided by the torsional bevel 10 and is pushed while being rotated (FIGS. 11 and 13). The rotating angle in this operation is rightward 26 degrees as will be understood from comparison of said both figures.

(5) When the lower cone 9 is inserted into the engaging hole 75, the cone 9 is automatically returned and rotated by virtue of tension of the coil spring 23 and the upper and lower containers 71A and 71B are completely locked to complete loading (FIGS. 13 and 11).

The cone lock utilizes the automatic rotation of the cone 9 caused by the guide of the torsional bevel 10 formed in the lower cone 9 and the tension of the coil spring 23 which acts so as to resist said rotation to automatically engage the lower cone 9. This saves trouble of manual rotation of the cone 9 when the latter is placed in engagement, and in addition, the cone lock may be attached to the lower-corner cone socket 72 in the state where the upper layer container 71A is slightly pulled up, thereby eliminating the necessity of a so-called high-level work. Further, since the upper and lower cones 8 and 9 and the lever 13 are integrally rotated through the shaft 7, whether or not the cones 8 and 9 are locked can be confirmed without mistake if one sees the position of pivotal movement of the lever 13. For example, it can be designed so that the fore end of the large diameter portion 13b of the lever 13 and the fore end of the engaging lever 27 projectingly provided on the casing 1 are brightly colored in yellow, red or the like, whereby one may check at a glance the state where they are regularly spaced apart and locked without fail even from a remote location. The stopper means to define the free pivotal movement of the operating lever 13 is constituted by the engagement between the stopper 19 provided on the lever 13 and the stopper shoulder 20 provided on the casing 1, and the lever 13 itself may be pulled out to simply release said engagement. Since the lever 13 is slidably mounted on the shaft 7 but not fixedly secured to the shaft 7, even if the lever is subjected to unexpected breakage or bending during the use, the lever 13 alone may be replaced with a new one.

The operation of the cone lock at the time of unloading will be carried out in the following procedure.

Figure 14:
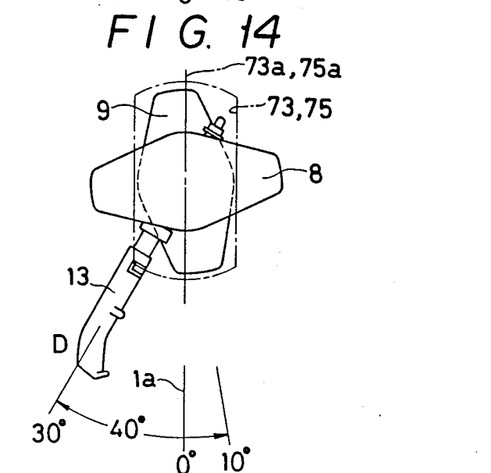
Figure 15:
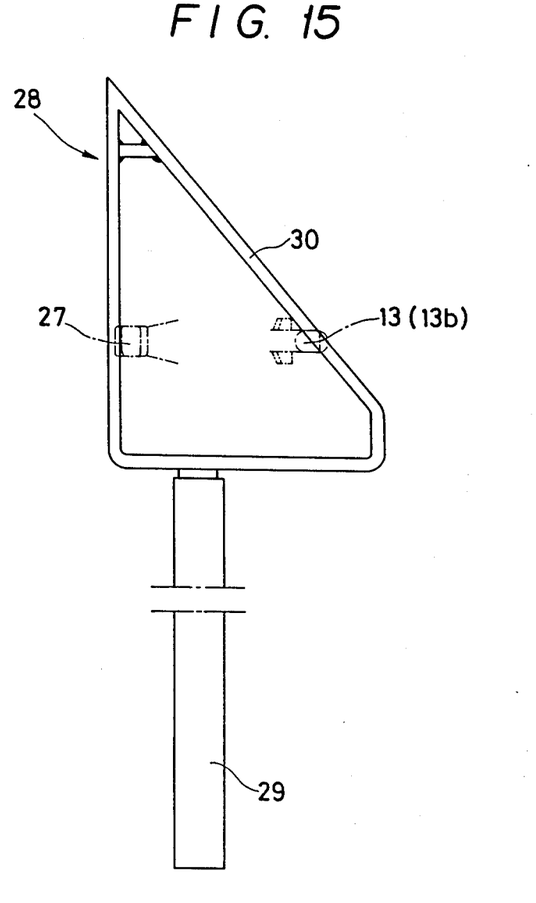
FIG. 15 is a front view of an operating lever.

(1) Turn the lever 13 in the basic attitude by the operating rod 28 as shown in FIG. 15 to turn it rightward through 40 degrees (maximum) to turn the lower cone 9 to the open position (FIGS. 11 and 14). The lever 13 engages the engaging projection 26 and the returning movement thereof is impeded, and the lower cone 9 remains maintaining the open position. The aforesaid operating rod 28 is obtained by securing an engaging element 30 which is formed by bending a pipe into an approximately triangle to the end of a lengthy gripping rod 29. Slip the engaging element 30 over the large diameter portion 13b of the lever 13 projected from the side (0—0) of the container (and cone sockets 72 and 74) as shown in FIG. 2A to the outward (downward in the figure) and the engaging lever 27. Then, when the operating rod 28 is pulled downward, the spacing between left and right frames of the engaging element 30 is gradually reduced, and therefore the lever 13 horizontally swings so as to move toward the engaging lever 27.

(2) Pull up the upper-layer container 71A to disengage it from the lower-layer container 71B and lower it on the quay. In the state shown in FIG. 14, the upper cone is still in the locked state, and the cone lock is pulled up without fail on the upper-layer container 71A.

(3) At the quay, rotate the lever 13 to the open position of the upper cone 8 to remove the cone lock from the upper-layer container 71A (FIGS. 14, 11 and 12).

Figures 16, 17, 18:
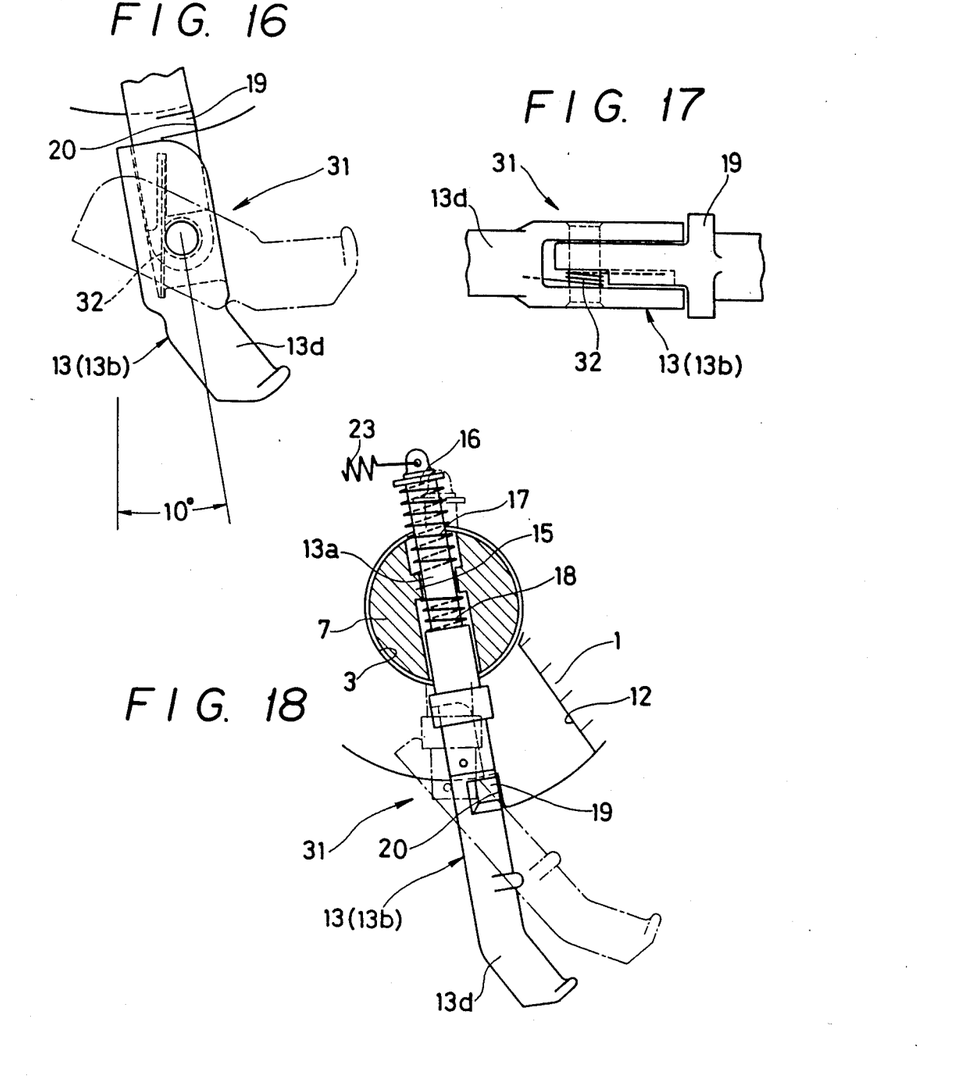
FIG. 16 is a plan view of essential parts showing a second embodiment of the lever.
FIG. 17 is a side view of a pin joint of the lever.
FIG. 18 is a plan view showing a third embodiment of the lever.
Figure 22:
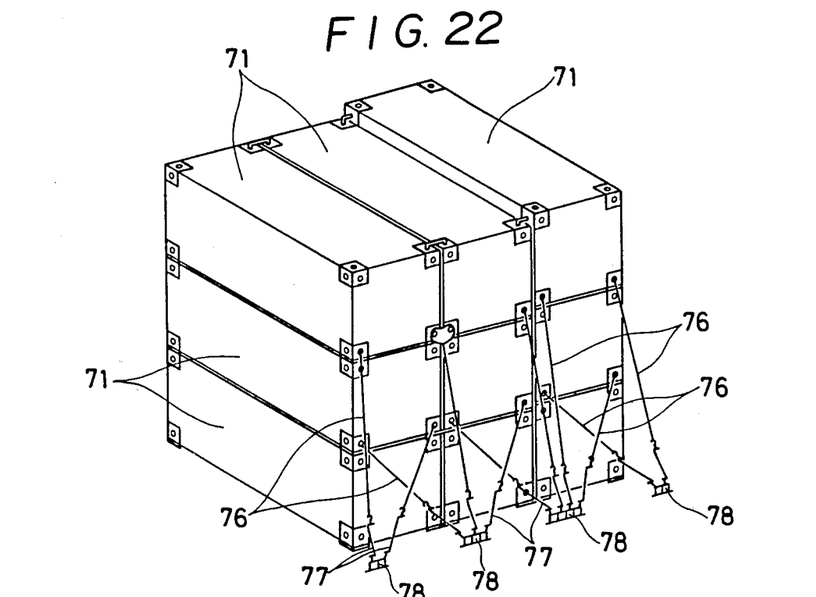
FIG. 22 is an explanatory view showing the using state of a lashing rod.
Figures 23, 24:
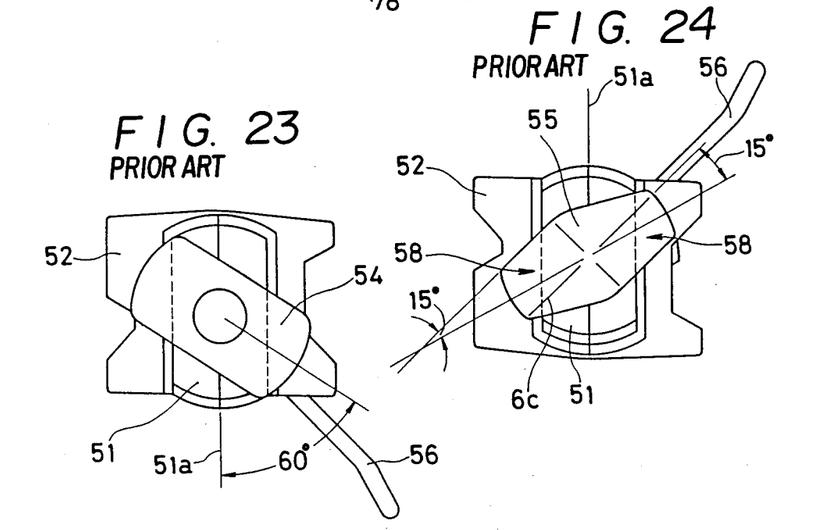
FIG. 23 is a plan view of a cone lock according to prior art.
FIG. 24 is a bottom view thereof.
Figure 25:
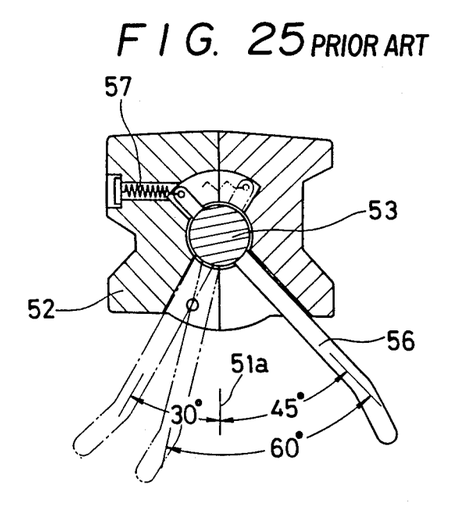
FIG. 25 is a cross sectional view thereof.

The following structure may be further added to the cone lock constructed as described above. That is, where a number of containers are loaded on the ship, it is general that in addition to the procedure in which the cone locks as connecting members are interposed between the floor surface and the first-layer container and between the vertically stacked containers, a lashing rod 76 as shown in FIG. 22 is extended between the floor surface and each of the containers for the purpose of enhancing the fastening strength and reliability. This lashing rod 76 has, on the upper end of a rod having the required length, a cone (not shown) in engagement with an engaging hole (73', see FIG. 20) on the side of the cone socket 72 and at the lower end, a hook. This hook is connected to one end of a turnbuckle 77 which is in turn connected to an engaging member 78 engageably secured in advance to the floor surface, and when in use, the turnbuckle 77 is tightened. However, since the cone sockets 72 at corners of the container are used common to the cone lock, the operating lever 13 of the cone lock projected laterally and externally of the cone socket 72 sometimes obstructs the work of extending the lashing rod 76. It is contemplated in this case that the lever 13 itself may be folded so that the lashing rod 76 may be extended even if the operating lever 13 is present. The lever 13 shown in FIGS. 16 and 17 has a pin coupling 31 with a spring 32 at a position of the large diameter portion 13b of the lever 13 close to the outer end of the stopper 19 so that the fore end 13d of the lever may be folded leftward against the resiliency of the spring 32, the said end being folded by being pressed by the lashing rod 76 extended in the defined location. The lever 13 shown in FIG. 18 is constituted by a pin coupling 31, without a spring, for the fore end 13d to be folded leftward at a position close to the base end of the stopper 19. The fore end 13d pressed by the lashing rod 76 is pivotally moved around the outer edge of the stopper shoulder 20 of the casing as indicated by the broken lines, and the pin coupling 31 is moved oppositely and rightward to excessively pull the coil spring 23 to thereby impart a restoring force toward the normal state. With the movement of the pin coupling 31, the shaft 7 and cones 8 and 9 slightly rotate, which rotation howeve may be restrained to such a degree as not to change the rotating position of the cones 8 and 9 (whether they are in the open or locked position with respect to the engaging hole).

While in the foregoing, we have explained the preferred embodiments, it will be obvious that the present invention may be variously modified without departing from the principle thereof. It is therefore desired that all the modifications by which the effects of the present invention may be substantially obtained through the use of structures substantially identical or corresponding thereto be included in the scope of the present invention by the appended claim.

What is claimed is:

1. A cone lock operable to engage first and second aligned socket openings to effect locking together of said socket openings, comprising a casing means, a shaft means rotatably supported in said casing means, said shaft means having an axis which is substantially vertically disposed during use of the cone lock, upper and lower cone means fixed to respective upper and lower ends of said shaft means, said upper cone means extending laterally from said shaft means at one angle, said lower cone means extending laterally from said shaft at another angle which is different from said one angle, a lever means connected to said shaft means and extending laterally from said shaft means, said lever means being rotatable between a stop position, a first operable position and a second operable position, spring biased stop means biasingly urging said lever means in said stop position, said housing means having upper and lower projection portions adopted to align with said first and second socket openings, each of said upper and lower cone means having an aligned rotational position in which the respective cone means is aligned with its respective housing portion so that respective aligned cone means and respective housing portions can be inserted into and removed from a respective socket opening, each of said first and second cone means having non-aligned rotational positions in which the respective cone means is non-aligned with its respective housing portion so that the respective nonaligned cone means and respective housing portion is precluded from being inserted into and removed from a respective socket opening, each of said upper and lower cone means being in a non-aligned position when said lever means is in said stop position, said upper and lower cone means being in respective aligned and non-aligned positions when said lever means is in said first operable position to thereby provide for inserting said upper cone means and upper housing portion into a first socket opening, said upper and lower cone means being in respective non-aligned and aligned positions when said lever means is in said second operable position to thereby provide for inserting said lower cone means and lower housing portion into a second socket opening, and engageable contour means on said lower cone means operable to be engaged by said second socket opening to automatically rotate said lower cone means and said connected shaft and lever means, in opposition to said bias of said spring biased stop means, from said stop position to said second operable position to thereby provide for insertion of said lower cone means and lower housing portion into said second socket opening without requiring any manual manipulation of the cone lock, said spring biased stop means being operable to rotate said lever means from said second operable position to said stop position after said second cone means has been inserted into said second socket opening.

2. A cone lock according to claim 1, wherein said engageable contour means comprises a torsional bevel surface.

3. A cone lock according to claim 1, wherein said lower cone means has a cone axis of rotation, said engageable contour means comprises a bevel surface which engages said second socket opening to effect rotation of said lower cone means about said cone axis as said lower cone means is inserted into said second socket opening parallel to said cone axis.

4. A cone lock according to claim 1, wherein said engageable contour means has a generally overall conical configuration with a torsional bevel which is engageable with said second socket opening such that when the cone lock is moved parallel to the axis of said shaft means such that the second cone means is inserted into said second socket opening, said torsional bevel is rotated by being engaged by said second socket opening to thereby effect rotation of said second cone means and its connected shaft means and lever means from said stop position to said second operable position.

5. A cone lock according to claim 1, wherein said shaft means rotates in one direction when said lever moves between said stop position and said first operable position, said shaft means rotating in an opposite direction when said lever is moved between said stop position and said second operable position.

6. A cone lock according to claim 1, wherein each of said upper and lower cone means has a non-circular cross-sectional configuration considered in a plane perpendicular to the axis of said shaft means and each has an elongate transverse axis passing through and perpendicular to the axis of rotation of said shaft means, said elongate axes of said upper and lower cone means extending generally criss-cross to one another generally in the form of an X with the center of said X being coincident with said axis of said shaft means.

7. A cone lock according to claim 1, wherein said socket openings are non-circular and have an elongate transverse axis, each of said first and second housing portions being non-circular and having an elongate transverse axis, said elongate transverse axes of said first and second housing portions being mutually aligned, each of said upper and lower cone means being non-circular and having an elongate transverse axis, said elongate transverse axes of said upper and lower cone means extending generally criss-cross to one another generally in the form of the letter X, thereby precluding simultaneous mutual alignment of said transverse elongate axes of said upper and lower cone means with the respective transverse elongate axes of said upper and lower housing portions.

8. A cone lock according to claim 1, wherein said spring biased stop means comprises a stop part on said casing means engaged by said lever means when said lever means is in said stop position, said spring biased stop means further comprising a spring connected between said casing means and said lever means biasing said lever means against said stop part, lever mounting means mounting said lever on said shaft means for movement in a direction perpendicular to the axis of said shaft means between a stopdefining position and a stop-releasing position, biasing means disposed between said lever means and said shaft means for biasing said lever means in said stop-defining position, said lever means being moveable in opposition to said biasing means from said stop-defining position to said stop-releasing position to thereby permit said lever means to be moved from said stop position to said first operable position.

9. A cone lock according to claim 1, wherein said lever means comprises a first and second lever portion, and pivotal means pivotably mounting said first and second portions so that said second portion can be pivoted relative to said first portion.

10. A cone lock according to claim 9, wherein said pivotal means comprises spring means biasing said first and second lever portions relative to one another.

11. A cone lock according to claim 1, wherein said lower cone means has an axis coincident with the axis of rotation of said shaft means, said lower cone means having a non-circular transverse configuration when viewed in a direction parallel to said cone axis.

12. A cone lock according to claim 1, wherein said upper cone means has a generally oblong cross-sectional configuration in a plane perpendicular to the axis of said shaft.

13. A cone lock according to claim 12, wherein said upper cone means has a major and minor transverse axis perpendicular to one another, end walls generally perpendicular to said major transverse axis, and side walls having first and second side wall sections each disposed at an acute angle relative to said minor transverse axis.

14. A cone lock according to claim 1, wherein said upper and lower housing portions each have a generally rectangular crosssectional configuration in a plane perpendicular to the axis of said shaft means.

15. A cone lock according to claim 13, wherein each of said upper and lower housing portions have opposed side walls and opposed end walls, said side walls being longer than said end walls.

16. A cone lock according to claim 1, wherein said casing means further comprises an engaging projection extending in a position spaced from said lever means, said engaging projection and said lever means being adapted to be engaged by a manually manipulated operating rod to effect movement of said lever means from said stop position to said second operation position for effecting unlocking of said cone lock by manual manipulation of said operating rod.

* * * * *